Dec. 7, 1954     F. F. KISHLINE ET AL     2,696,388
VEHICLE BODY BRACE

Filed Oct. 30, 1952     2 Sheets-Sheet 1

INVENTORS
FLOYD F. KISHLINE
JOHNSTON STUART VOIGT
BY
ATTORNEY.

Dec. 7, 1954
F. F. KISHLINE ET AL
2,696,388
VEHICLE BODY BRACE
Filed Oct. 30, 1952
2 Sheets-Sheet 2
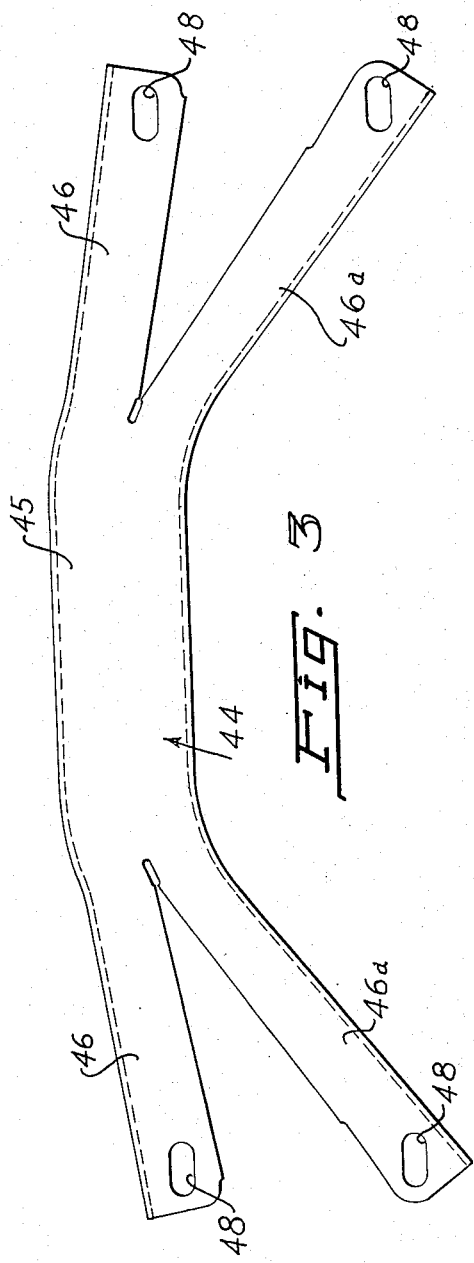
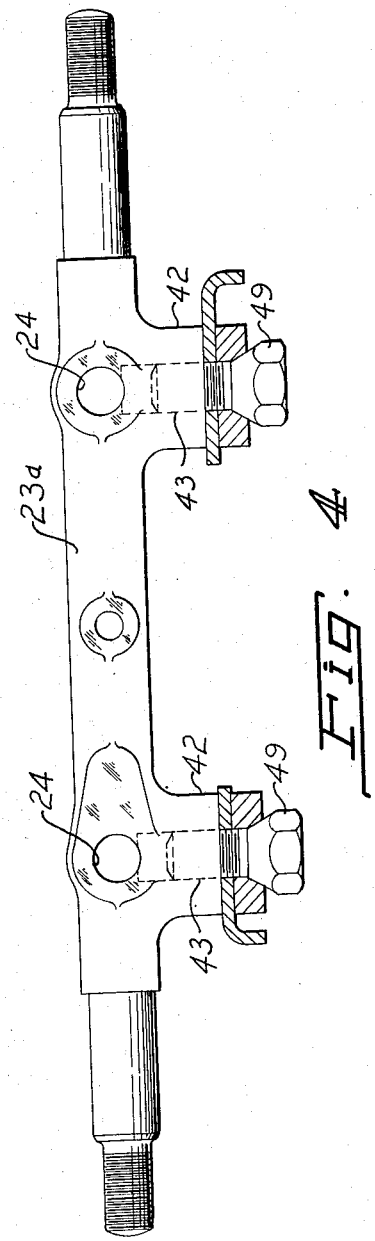
INVENTORS
FLOYD F. KISHLINE
JOHNSTON STUART VOIGT
BY
ATTORNEY.

United States Patent Office 2,696,388
Patented Dec. 7, 1954

2,696,388
VEHICLE BODY BRACE

Floyd F. Kishline and Johnston Stuart Voigt, Kenosha, Wis., assignors to Nash-Kelvinator Corporation, Kenosha, Wis., a corporation of Maryland Application October 30, 1952, Serial No. 317,614

8 Claims. (Cl. 280—106.5)

This invention relates to vehicle body braces for wheel suspension and more particularly to a brace for the lower control arm pivot bar for front wheel suspension.

It is an object of this invention to provide a vehicle body brace to be used with the lower control arm pivot bar for front suspension which is simple and economical to manufacture.

One of the principal objects of this invention is to mount a brace on the spaced cross shafts in a vehicle suspension arrangement which brace is provided with a pair of arms at each end and integral with a main central supporting section. As a result of this feature, each pair of arms is secured at two places on each cross shaft whereby the brace extends between the oppositely disposed cross shafts.

Heretofore, the brace connecting the cross shafts in a front suspension arrangement has comprised a structure having only one connecting portion at each end. This brace was disposed between oppositely disposed cross shafts and each end was connected to said cross shaft. Using this latter type of brace did not prove satisfactory in association with the front suspension lower control arm pivot bar for all practical purposes. This was particularly true in the case of an automobile vehicle in which independent front wheel suspension assemblies are directly carried by the vehicle body. The applicant has determined, by exhaustive tests, for best results, that only a special type of brace can be satisfactorily used to unite the wheel housings and thus help to distribute the load. This load may be likened to opposing forces normally set up in a vehicle during normal operation and whereby if not controlled, set up vibrations which seriously affect the welds and parts of the vehicle adjacent said welds. The brace of the instant invention, together with the new design of the cross shaft with which the brace cooperates, affords a medium through which the above stated forces are more evenly distributed and controlled. This arrangement has greatly lessened the danger of damage in weld connections and to the vehicle body as a whole.

It is another object of my invention to overcome the aforesaid undesirable effects and difficulties in an improved manner.

Other and further objects and advantages and the structure whereby they are attained will become more fully apparent from the following detailed description when read in connection with the drawings forming a part thereof.

In the drawings:

Figure 3 is a top view of the brace.

Figure 4 is a side elevational view of the cross shaft to which the brace of Fig. 3 is secured in wheel suspension position.

Figure 1:
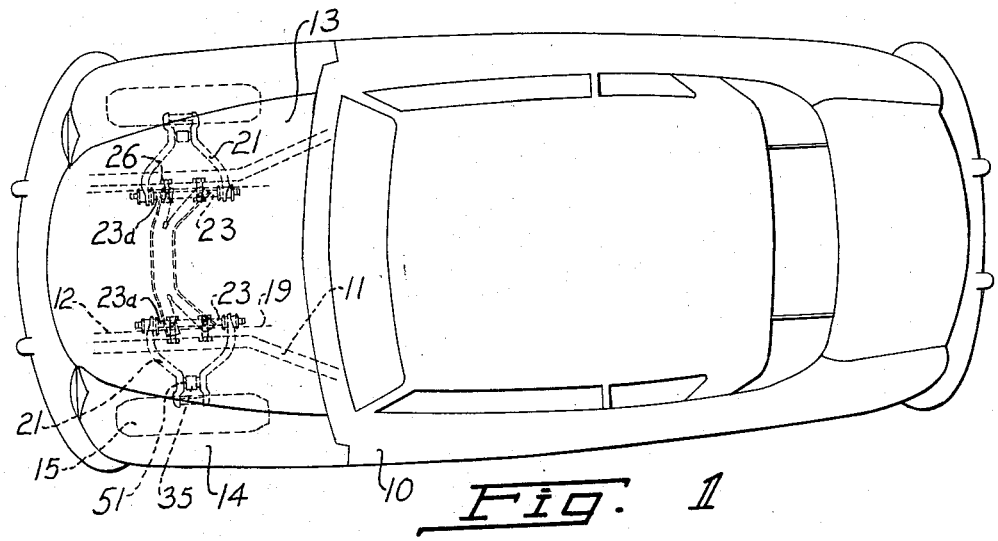
Figure 1 is a plan view of an automotive vehicle showing the brace of my instant invention with only the lower control arms of the front suspension system being shown.
Figure 2:
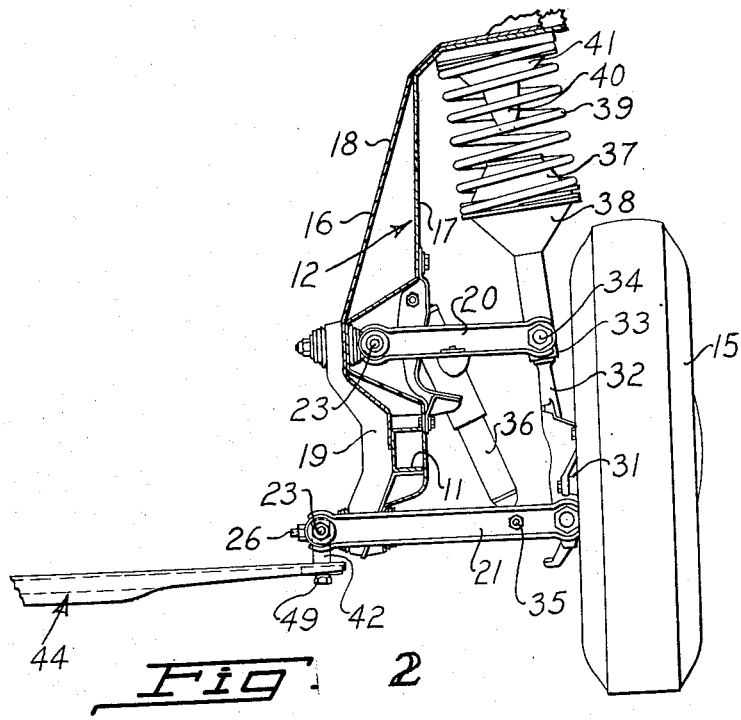
Figure 2 is a vertical sectional view partially broken away to more clearly illustrate the invention.

Referring in detail to the drawings, the vehicle body 10 is made up generally of sheet metal panel members which are welded to the principal frame members 11, these frame members extending throughout the length of the vehicle body, thereby providing a "unitized" body and frame structure. At the forward end of the automotive vehicle a portion of the body is formed in the manner of a wheel housing 12 which housing is ultimately completely covered by the hood 13 and the front fender 14, said wheel housing substantially embracing one of the front wheels 15. One side of the wheel housing 16 forms a side wall of the engine compartment. The wheel housing 12 is generally comprised of two sheet metal stampings 17 and 18 which are welded together at various points to form a rigid housing structure. A third sheet metal stamping 19 provides additional rigidity to the wheel housing in the region where the control arms 20 and 21 are secured to the wheel housing 12.

The control arm assemblies 20 and 21 may be made up of pairs of forgings or stampings, four of which forgings or stampings would be utilized in making up the two control arm assemblies 20 and 21. The arms 20 are free to swivel on cross shaft 23.

Bolt members 26 are mounted in threaded bores 24 of a shaft member 23, designated specifically as 23a, and may be clamped to the shaft member 23a in any suitable manner. Bolt members 26 extend through the walls of wheel housing 12 and are rigidly secured to said housing by means of any suitable fastening elements.

The wheel 15 is supported on wheel spindle 31 which is secured to king pin 32. A forging 33 at the upper end of the king pin has a central portion which may be threadedly mounted on the upper end of the king pin 32 and may be provided with outwardly extending bolt portions 34 on which the outer ends of the control arms 20 may be threadedly and swivelly mounted. The wheel spindle member 31 may have a boss portion to which the steering linkage (not shown) may be fastened. The arm 21 may secure, by means of bolt 35, a supporting connection for the lower end of shock absorber 36. The numeral 37 has reference to a stamping which is secured to cup member 38 which is mounted on the forging 33. Coil spring 39 is interposed between the king pin 32 and wheel housing 12. A cup-like stamping 41 is welded at its base to wheel housing 12 and protrudes downwardly within coil spring 39 to limit the upward travel of king pin 32, snubber 40 engaging the stamping 37 whenever wheels 15 engage road conditions sufficiently severe to cause spring 39 to be subjected momentarily to severe compression forces. Coil spring 39 absorbs the great majority of the jolts imparted to wheels 15 while the vehicle is traveling over rough terrain without causing snubber 40 to contact stamping 37. It will be noted that the mounting of the coil spring 39 directly above the king pin 32 and closely adjacent to the wheel 15 serves an important function in that spring 39 directly absorbs the vertical movement of king pin 32 thus relieving the control arms 20 and 21 of substantially all of the vertical load resulting from the weight of the vehicle. The spring 39 being mounted at a maximum radial distance from the control arm pivot shaft 23, where a longer range of vertical movement is afforded, can thus be made longer and more flexible resulting in a somewhat smoother vehicle ride. The portion of the wheel housing 12 which the coil spring 39 engages is structurally strong enough to support the vertical load of the vehicle relative to the wheels.

Each shaft 23 has provided along its longitudinal surface, a pair of spaced boss elements 42 which are arranged in line and in parallel relationship to one another. Each boss 42 extends at substantially right angles outwardly from said shaft 23 and is provided with, in each instance, a threaded aperture 43 also formed at right angles with said shaft and with the apertures arranged in parallel relationship with each other. In actual assembled position, as shown in Figure 4, these bosses depend straight down from shaft 23a. Attention is directed to Figure 1 wherein it is shown that two of these shafts 23a are provided. It will be noted that the shafts 23a are each spaced adjacent to an adjacent wheel housing and are in parallel relationship to one another.

A K-shaped brace 44 is disposed between said wheel housings and mounted at each end to said bosses 42 by any suitable fastening elements 49.

The brace 44, which may be stamped out of a single piece of sheet metal, is shown in detail in Figure 3, and is composed of a channeled intermediate or central body portion 45 having a pair of separate channeled members 46 and 46a at each end which extend outwardly and away from each other. These members 46 and 46a are integral with the central body portion 45 and converge into said body portion 45. The overall shape of such brace when taking each pair of channeled members 46 and 46a together with the central portion 45 in consideration, resembles the letter K.

Adjacent the ends of each of said members 45 and 45a are formed elongated apertures 48, in each instance being of approximately the same shape. These apertures are elongated merely to compensate for the variations in distances between wheel housings in steel vehicle bodies of this kind. It is planned to utilize suitable fastening members of great holding strength to adequately secure the end members of the brace to the bosses 42 of the shafts 16a without regard to the length of the apertures. The brace 44 is secured to the bosses 42 of said spaced shafts 23a through mounting suitable fastening elements 49. By this arrangement the brace 44 is supported at spaced and separate points on each shaft 23a whereby to present more secure and reliable wheel suspension mountings.

It is believed that the construction, manipulation, utility and advantages of this invention will now be clearly apparent to those skilled in this art without a more detailed description thereof.

The present embodiment of the invention has been described in considerable detail merely for the purposes of exemplification since in actual practice it attains the features of the invention and the above description.

It will be apparent that changes in the details of construction, and in the combinations and arrangements of parts may be resorted to without departing from the spirit or scope of the invention as hereinafter claimed or sacrificing any of its advantages.

What we claim as our invention is:

1. A suspension means for suspending a vehicle body relative to its wheels, comprising spaced housing members forming part of the vehicle body and each partially embracing an adjacent vehicle wheel, wheel spindles, a pin associated with each of said wheel spindles, a pair of spaced arms pivotally secured to each of said housings at one of their ends and pivotally attached to opposite ends of one of said pins at their other ends, a brace comprising a single sheet of material disposed between said housings, said brace comprising split end members provided with an aperture in each of said members, and arranged to unite a pair of said oppositely disposed arms.

2. A suspension means for suspending a vehicle body relative to its wheels, comprising spaced housing members forming part of the vehicle body and each partially embracing an adjacent vehicle wheel, a shaft mounted on each of said housing members, spaced arms rotatable on said shaft, a brace comprising a single sheet of metal disposed between said housings, said brace comprising spaced split end portions, each portion provided with an elongated slot, fastening elements, said brace uniting said arms through the medium of said fastening elements disposed in said slots and anchored in said shaft.

3. A suspension means for suspending a vehicle body relative to its wheels, comprising spaced housing members forming part of the vehicle body and each partially embracing an adjacent vehicle wheel, a shaft mounted on each of said housing members and disposed between said members, spaced bosses on each of said shafts, an arm rotatable on each shaft, a brace comprising a single sheet of metal disposed between said housings, said brace comprising spaced split end portions, each portion provided with an elongated slot, fastening elements, said brace uniting said arms through the medium of said fastening elements disposed in said slots and anchored in said bosses.

4. A suspension means for suspending a vehicle body relative to its wheels, comprising spaced housing members forming part of the vehicle body and each partially embracing an adjacent vehicle wheel, a shaft mounted on each of said housing members, an arm rotatable on each shaft, a brace comprising a single sheet of metal disposed between said housings, said brace comprising spaced split end portions and having a solid intermediate member integral with said split end portions, said end portions provided with an elongated slot, fastening elements, said brace uniting said arms through the medium of said fastening elements disposed in said slots and anchored in said shaft.

5. A suspension means for suspending a vehicle body relative to its wheels, comprising spaced housing members forming part of the vehicle body and each partially embracing an adjacent vehicle wheel, a shaft mounted on each of said housing members and disposed between said members, spaced bosses on each shaft in parallel relationship with one another relative to said shaft, an arm rotatable on each shaft, a brace comprising a single sheet of metal disposed between said housings, said brace comprising a channeled central portion having split and spaced semi-channeled end members integral with said central portion, each of said end members provided with an elongated slot, fastening elements, said brace uniting said arms through the medium of said fastening elements disposed in said slots and anchored in said bosses.

6. A suspension means for suspending a vehicle body relative to its wheels, comprising spaced housing members forming part of the vehicle body and each partially embracing an adjacent vehicle wheel, spaced pivot shafts, each shaft provided with spaced bosses in parallel relationship with each other along said shaft, each shaft provided with spaced apertures, each aperture arranged adjacent one of said bosses, each of said shafts secured to one of said housings, through fastening elements arranged in each aperture and anchored in said housing, an arm rotatable on each shaft, a brace comprising a single sheet of metal disposed between said housings, said brace comprising a rectangularly shaped channeled central portion and forked end members integral with said central portion, each forked end member provided with an elongated slot, fastening elements, said brace uniting said arms by said fastening elements disposed in said slots and anchored in said bosses.

7. In combination with a suspension means for suspending a vehicle body relative to its wheels, spaced wheel housings associated with and forming part of said body, a brace for uniting said housings comprising a single sheet of metal including a channeled central portion and spaced fork like end members integral with and converging with said central portion.

8. In combination with a suspension means for suspending a vehicle body relative to its wheels, spaced wheel housings associated with and forming part of said body, spaced pivot shafts, one each of said shafts secured to each one of said housings, each of said shafts provided with spaced bosses arranged in parallel relationship along each shaft, a brace disposed between said housings comprising a single sheet of metal including a channeled rectangularly shaped central portion and spaced fork like end members integral with and converging with said center portion, said end members provided with an elongated slot, fastening elements, said brace uniting said housings through the medium of said fastening elements disposed in said slots and anchored in said bosses.

References Cited in the file of this patent

UNITED STATES PATENTS

| Number | Name | Date |
|---|---|---|
| 1,908,638 | Maddock | May 9, 1933 |
| 1,928,942 | Maddock | Oct. 3, 1933 |
| 2,351,651 | Wulff | June 20, 1944 |

FOREIGN PATENTS

| Number | Country | Date |
|---|---|---|
| 642,835 | Great Britain | Feb. 6, 1948 |